(12) United States Patent
Hood et al.

(10) Patent No.: US 7,422,714 B1
(45) Date of Patent: Sep. 9, 2008

(54) METHOD OF USING A SHAPE MEMORY MATERIAL AS A MANDREL FOR COMPOSITE PART MANUFACTURING

(75) Inventors: Patrick J. Hood, Bellbrook, OH (US); David E. Havens, Bellbrook, OH (US); Matthew C. Everhart, Fairborn, OH (US)

(73) Assignee: Cornerstone REsearch Group, Inc., Dayton, OH (US)

( * ) Notice: Subject to any disclaimer, the term of this patent is extended or adjusted under 35 U.S.C. 154(b) by 266 days.

(21) Appl. No.: 11/147,926

(22) Filed: Jun. 8, 2005

Related U.S. Application Data

(63) Continuation-in-part of application No. 10/056,182, filed on Jan. 24, 2002, now Pat. No. 6,986,855.

(60) Provisional application No. 60/263,986, filed on Jan. 24, 2001.

(51) Int. Cl.
*B29C 33/40* (2006.01)

(52) U.S. Cl. .................... 264/219; 264/230; 264/313; 264/334; 425/440

(58) Field of Classification Search .............. 264/219, 264/230, 313, 334
See application file for complete search history.

(56) References Cited

U.S. PATENT DOCUMENTS

| | | | |
|---|---|---|---|
| 3,453,247 A | 7/1969 | Sartori et al. | |
| 3,557,072 A | 1/1971 | Vergne et al. | |
| 3,684,782 A | 8/1972 | Longi et al. | |
| 4,110,396 A | 8/1978 | Reynolds | |
| 4,136,248 A | 1/1979 | Tenney | |
| 4,178,424 A | 12/1979 | Tenney et al. | |
| 4,193,899 A | 3/1980 | Brenner et al. | |
| 4,203,884 A | 5/1980 | Coran et al. | |
| 4,250,063 A | 2/1981 | Kotani et al. | |
| 4,262,103 A | 4/1981 | Minchak | |
| 4,553,936 A | 11/1985 | Wang | |
| 4,675,061 A | 6/1987 | Mead | |
| 4,831,094 A | 5/1989 | Stein et al. | |
| 4,950,258 A | 8/1990 | Kawai et al. | |
| 5,013,507 A | 5/1991 | Julien et al. | |
| 5,049,591 A * | 9/1991 | Hayashi et al. | 521/159 |
| 5,057,252 A | 10/1991 | Kagawa et al. | |
| 5,098,776 A * | 3/1992 | Kobayashi et al. | 442/104 |
| 5,189,110 A | 2/1993 | Ikematu et al. | |
| 5,478,235 A | 12/1995 | Schuldt et al. | |
| 5,861,114 A | 1/1999 | Roffman et al. | |

(Continued)

OTHER PUBLICATIONS

Takahashi et al., "Structure and Properties of Shape-Memory Polyurethane Block Copolymers", Journal of Applied Polymer Science, 1996, pp. 1061-1069, 60, John Wiley & Sons.

(Continued)

*Primary Examiner*—Suzanne E. McDowell
(74) *Attorney, Agent, or Firm*—Eugene P. Sunday

(57) ABSTRACT

A method of fabricating and using a removable, inflatable mandrel of shape memory polymer for use in manufacturing composite parts including the steps of providing a processed pre-form of shape memory polymer, replicating a mold with the shape memory polymer, using the mold as a mandrel in the creation of composite parts, and removing the shape memory mandrel quickly and easily from the part without damage to the finished part.

2 Claims, 3 Drawing Sheets

U.S. PATENT DOCUMENTS

| | | | |
|---|---|---|---|
| 5,880,896 | A | 3/1999 | Ishii et al. |
| 5,949,521 | A | 9/1999 | Williams et al. |
| 6,083,442 | A | 7/2000 | Gabilly |
| 6,086,204 | A | 7/2000 | Magnante |
| 6,102,933 | A | 8/2000 | Lee et al. |
| 6,113,817 | A | 9/2000 | Herbrechtsmeier et al. |
| 6,583,194 | B2 * | 6/2003 | Sendijarevic ............... 521/172 |
| 6,705,585 | B1 | 3/2004 | Roy |
| 6,827,325 | B2 * | 12/2004 | Hofmann et al. ............ 249/134 |
| 6,830,712 | B1 * | 12/2004 | Roffman et al. ............ 264/1.38 |
| 6,986,855 | B1 * | 1/2006 | Hood et al. .................. 264/219 |

OTHER PUBLICATIONS

Kim et al., "Polyurethanes Having Shape Memory Effects", Polymer, 1996, pp. 5781-5793, 37, No. 26, Elsevier Science Ltd., GB.

Li et al., "Studies on Thermally Stimulated Shape Memory Effect of Segmented Polyurethanes", J of Appl Polym Sci, 1997, pp. 1511-1516, 64, John Wiley & Sons, Inc.

Skakalova et al., "Shape Memory Effects of Dehydrochlorinated Crosslinked Poly(Vinyl Chloride)", Macromol. Chem. Phys. 2, 1997, pp. 3161-3171, 198, Huthig & Wepf Verlag Zug.

Lin et al., Study on Shape Memory Behavior of Polyether Based Polyurethanes I., Influence of the Hard-Segment Content, J of Appl. Polym Sci, 1998, pp. 1563-1574; 69.

Rodriguez-Perez et al., "The Recovery Behavior of Crosslinked Closed Cell Polyolefin Foams", Polymer Engineering & Science, May 1998; pp. 831-837, 38, No. 5, Valladolid,Spain.

Kagami et al., "Shape Memory Behaviors of Crosslinked Copolymers Containing Stearyl Acrylate", Macromol. Rapid Com 1996; pp. 539-543; 17; Huthig & Wepf Verlag, Zug.

Mantz et al., "Thermolysis of Polyhedral Oligomeric Silsesquioxane (POSS) Macromers and POSS-Siloxane Copolymers," Chem Mater., 1996, pp. 1250-1259, 8; Am Chemical Society.

Charoensirisomboon et al., "Polysulfide Containing S-Triazine Rings as a New Thermoplastic Elastomer: Spherulite Morphology & Strain Recovery Behaviour," Polymer, 1998, pp. 2089-2093, 39, No. 11, Elsevier Science Ltd.

Bogdanov et al., "Correction of Segmented Mirror Abberations by Phase Conjugation and Dynamic Holography," Optic Communications, 1996; pp. 405-413; 129, Elsevier.

Kim et al., "Polyurethane Ionomers Having Shape Memory Effects," Polymer, 1998, pp. 2803-2808, 39, No. 13, Elsevier.

Haddad et al., "Hybrid Styryl-Based Polyhedral Oligomeric Silsesquioxane (POSS) Polymers," Polymer, Mat.Res.Soc.Symp. Proc., 1996, pp. 25-32, 435, Matls Research Society.

Engineered Material Handbook, Adhesives and Sealants, 1999, pp. 316-318, 2nd Edition, ASM International, US.

Malkin et al., "Experimental Methods of Polymer Physics," 1983, pp. 38-41, Prentice-Hall, Englewood Cliffs, NJ.

Hecht, Optics, 2nd Ed., 1987, p. 351, Addison-Wesley, Reading, MA.

Gordon, "Applications of Shape Memory Polyurethanes," Proceedings of the Intl Conference on Shape Memory and Superelastic Technologies, 1994, pp. 115-120, Pacific Grove, CA.

Tobushi et al., "Deformation Properties of Polyurethane Shape Memory Polymers," Proc. of the 1st Intl Conf on Shape Memory and Superelastic Technologies, 1994, pp. 109-114.

"Shape Memory Polymers That Resist Creep Better," High-Tech Materials Alert, Jun. 2, 2000, John Wiley & Sons, Inc., US.

* cited by examiner

METHOD OF USING A SHAPE MEMORY MATERIAL AS A MANDREL FOR COMPOSITE PART MANUFACTURING

CROSS REFERENCE TO RELATED APPLICATIONS

This application is a continuation in part of application of Ser. No. 10/056,182, filed Jan. 24, 2002 that, in turn, claimed priority benefit of U.S. Provisional Application Ser. No. 60/263,986 filed Jan. 24, 2001.

BACKGROUND OF THE INVENTION

The present invention generally relates to the art of manufacturing composite structures and particularly to a method of fabricating a removable mandrel for use in filament winding of composite parts. More specifically, the present invention relates to the making and use of Shape Memory Polymer (SMP) molds as mandrels in a continuous filament winding process or other composite part manufacturing process.

Known processes for fabricating castable composite parts are very complicated and expensive. A large portion of the complexity and expense is associated with manufacturing related molds. Nearly any part can be constructed as a composite part by various production methods such as filament winding, tape placement, overbraid, chop fiber roving, coating, painting, dripping, hand lay up, resin soaked, or other composite processing technique and curing process.

These methods for constructing composite parts such as vessels, tanks, containers, pipes, air ducts, complex parts, and other parts are well known in the prior art. When these vessels, tanks, containers, pipes, air ducts, complex parts, and other parts are manufactured using a mandrel, there is typically a problem with removing the mandrel from the finished part. It is usually not advisable to cut the part from the mandrel, as this may destroy the recently fabricated part. It is desirable to remove the mandrel from the part. It is most desirable to be able to easily and quickly remove the mandrel from the part without damaging the finished part.

Typically, the first step in producing a castable composite part is to acquire a prototype that embodies the desired features. The prototype is then given to a tool and die facility that makes molds for replicating the prototype. The molds produced may encompass an assembly of individual components in which case a series of individual molds are required. In some cases, the mold is manufactured directly from a set of drawings in a three dimensional computer readable format which embody the desired features. A mold, set of molds, or set of pieces to make a mold is often referred to as "tooling".

Often times, castable composite parts are made with resins which require a thermal curing operation subsequent to the filament winding process. Therefore, molds for producing castable composite parts are typically made of metal, usually a type of steel, aluminum, or other durable lightweight material with a melting temperature above the anticipated curing temperature of the associated resin. Machining methods associated with producing metal molds are very expensive. Typically, a mold for casting a part with high surface definition and intricate three dimensional details is complex and expensive.

When making filament wound parts or structures, normally continuous resin soaked fiber is conventionally wound onto a mandrel in predetermined geometric patterns such as polar, helical or hoop windings, using computerized winding equipment. Creels hold the fiber and it is fed under tension. The mandrel may rotate or be passive. The orientation and thickness of the winding may be selected to match the direction and magnitude of loads in the final part or structure. Use of computer technology allows filament winding systems to produce complex shapes in addition to simple cylindrical or rectangular shapes. However, the more complex the part is the more expensive and time consuming it is to make the mold for the mandrel. Molds for parts with only one 60° angle can have dramatically higher costs than that of a simple pipe or tube.

Another continuous filament winding process, to which the present invention equally applies, is braiding in which a plurality, e.g., as many as 144 separate fiber tows are interwoven to form tubular products. Continuous filaments may also be employed in pultrusion processes, wherein a plurality of filament strands or rovings are passed under tension through a resin bath to apply a resin coating thereto, following which the filament is drawn through a pre-former, or initial forming die, which imparts a selected cross-sectional shape to the fiber array. The initially shaped fiber array is next passed through a heated die with constant cross-sectional area, by which the resin is cured, with the resulting rigid formed article being withdrawn and conveyed to a cut-off saw or other severing apparatus to form discrete product articles. The pultrusion process is conducted under continuous tension, by means of a puller or other drawing means which pulls the filament through the constituent unit step in the process systems. Additionally, other methods of manufacturing composite parts are known in the art and the present invention is not limited to the specifics processes mentioned herein.

Heretofore, the problem of removing the mandrel from the composite part has usually led to one of four solutions. The first is to sacrifice or destroy the mandrel upon removal from the finished part. This creates drastically increased costs and production times for mandrels as a new mandrel is needed for every part. The destruction of the mandrel can be accomplished in the form of a water soluble mandrel or a mandrel that is cut from the composite part. Dissolvable mandrels typically involve water soluble sand or salt formations that may be effective for large vessels but the binding agents in the mandrels are limited to relatively low temperature cures. Additionally, dimensional repeatability of sand and salt surfaces can be an extremely variable and require expensive tooling. A second solution is to use a mandrel that can be disassembled and removed from the mandrel, such as segmented mandrels. Use of such tooling to make mandrels can consume great amounts of time to install and remove and the tooling needed to form the mandrel is typically very expensive to make and can sacrifice tolerance repeatability. A third solution is to create a mandrel that remains part of the final composite part. This solution, while eliminating the need for removal of the mandrel, is still very expensive in that the mandrel must be designed and built as an integral part of the final manufacture piece. This drastically increases the overall expense of the final part. The final solution is to use inflatable mandrels that can be removed by deflating them after the part is created. Currently, this process typically involves a balloon-like mandrel that can only be used in low tolerance productions or in processes that require significantly more time and effort to make than the current invention. It is this solution that the present invention improves upon.

One known method of making inflatable mandrels is disclosed in U.S. Pat. No. 4,684,423. Using this method a rigid mandrel is prepared and supported on a rotatable axle. One or more layers of strips or rubber are applied longitudinally on the mandrel to form an enclosure. Coats of rubber solution are applied over the layers and a layer of fibers is wound over at least one of the layers. The rubber layers are then cured. The layers are cut into two parts. Cutting and splicing the mandrel structure results in an inherently weaker and less desirable mandrel. Since the area at the resulting joint is weaker than the remaining structure, the joint often fails sooner than the other portions, thus limiting the usable life of the mandrel.

Another method for fabricating an inflatable mandrel is disclosed in U.S. Pat. No. 5,259,901. Using this method a water soluble mandrel forms the base and an inflatable mandrel is constructed around the water soluble mandrel. Once the inflatable mandrel has cured, the water soluble mandrel is flushed out. The inflatable mandrel is then used to create the composite part. Once the finished part is made the inflatable mandrel is deflated and removed through an opening on the end. This process is expensive and time consuming and has the inherent problems of cost and tolerance repeatability of water soluble mandrels.

Another method for fabricating an inflatable mandrel is disclosed in U.S. Pat. No. 6,444,071. In this method, a dry three dimensional fabric layer of a given thickness is layed-up about an inflated bladder. An external vacuum/pressure bag is installed about the fabric layer. The dry fabric layer then is impregnated with a liquid soluble resin between the internal bladder and the external bag. The resin is cured to rigidify the three dimensional fabric layers to form a mandrel structure. A container then can be wound on the mandrel formed by the cured and rigidified fabric layer, and the resin subsequently is washed out to remove the fabric. The internal bladder is deflated and removed from inside the mandrel before the mandrel is used to filament wind the part. This process is also expensive and time consuming and has the inherent problems of cost and tolerance repeatability of water soluble mandrels.

Shape memory polymers (SMPs) and shape memory alloys (SMA) were first developed about 20 years ago and have been the subject of commercial development in the last 10 years. SMPs derive their name from their inherent ability to return to their original "memorized" shape after undergoing a shape deformation. SMPs that have been preformed can be deformed to any desired shape below or above its glass transition temperature ($T_g$). If it is below the $T_g$, this process is called cold deformation. When deformation of a plastic occurs above its $T_g$, the process is denoted as warm deformation. In either case the SMP must remain below, or be quenched to below, the $T_g$ while maintained in the desired thermoformed shape to "lock" in the deformation. Once the deformation is locked in, the polymer network cannot return to a relaxed state due to thermal barriers. The SMP will hold its deformed shape indefinitely until it is heated above its $T_g$, whereat the SMP stored mechanical strain is released and the SMP returns to its performed state.

Several known polymer types exhibit shape memory properties. Probably the best known and best researched polymer type exhibiting shape memory polymer properties is polyurethane polymers. Gordon, *Proc of First Intl. Conf. Shape Memory and Superelastic Tech.*, 115-120 (1994) and Tobushi et al., *Proc of First Intl. Conf. Shape Memory and Superelastic Tech.*, 109-114 (1994) exemplify studies directed to properties and application of shape memory polyurethanes. Another polymeric system based on crosslinking polyethylene homopolymer was reported by S. Ota, *Radiat. Phys. Chem.* 18, 81 (1981). A styrene-butadiene thermoplastic copolymer system was also described by Japan Kokai, JP 63-179955 to exhibit shape memory properties. Polyisoprene was also claimed to exhibit shape memory properties in Japan Kokai JP 62-192440. Another known polymeric system, disclosed by Kagami et al., *Macromol. Rapid Communication*, 17, 539-543 (1996), is the class of copolymers of stearyl acrylate and acrylic acid or methyl acrylate. Other SMP polymers known in the art includes articles formed of norbornene or dimethaneoctahydronapthalene homopolymers or copolymers, set forth in U.S. Pat. No. 4,831,094. Additionally, styrene copolymer based SMPs are disclosed in U.S. Pat. No. 6,759,481 which is incorporated herein by reference.

No known inflatable mandrel is suitable for rapid, cheap production with the ability to retain high tolerances. Polymer composite parts have the advantages of being light weight, having high specific mechanical properties, and having good corrosion resistance which make them indispensable materials. Thus a method for cheaply and quickly producing molds to manufacture these parts is needed. Furthermore, the production of complex shaped parts is still a challenge for the composite industry and the production of any complex part is both expensive and time consuming.

Therefore, there is a need in the art for a temporary, removable and reusable mandrel that provides the same high quality as other high cost metal mandrels. Additionally, there is a need for a mandrel that can quickly replicate complex parts via a mold to manufacture complex composite parts. It is these needs that the present invention satisfies.

SUMMARY OF THE INVENTION

In view of the foregoing needs and problems experienced in manufacturing mandrels, it is a primary objective of the present invention to provide a new method for fabricating mandrels to be used in the manufacturing of composite parts by methods such as filament winding, braiding, tape rolling, chop fiber roving, coating, painting, dipping, automated and hand lay-up, and resin transfer molding.

A wide variety of composite product articles are formable by filament winding, tape placement, overbraid, chop fiber roving, coating, painting, dripping, hand lay up, resin soaked, or other composite processing technique and curing process and pultrusion methods, including, but not limited to golf clubs, tennis rackets, pressure vessels, fishing rods, gas tanks, drive shafts, aerospace control linkages, sliding bearings, helicopter rotors, pipes, tubes, solid rods, missile launchers, artillery, bazookas, gun barrels, and various other structural members and component parts utilized in the aerospace, automotive, appliance, and consumer product industries, all of which are under the scope of the present invention.

In one exemplary embodiment of the invention, the method includes the steps of providing a pre-formed tube of Shape Memory Polymer (SMP), using a mold to deform the SMP tube to replicate the mold forming a SMP mandrel, filament winding resin soaked fibers around the deformed SMP mandrel, curing the resin, causing the deformed SMP Mandrel to return to its original smaller shape, and quickly and easily removing the SMP tube from the composite part.

Other features on the present invention include the use of other methods of fabricating composite parts in addition to the exemplary method of filament winding resin soaked fibers.

Other objects, features and advantages of the invention will be apparent from the following detailed description taken in connection with the examples and accompanying drawings and are within the scope of the present invention.

DETAILED DESCRIPTION OF EXEMPLARY EMBODIMENTS

Figure 1:
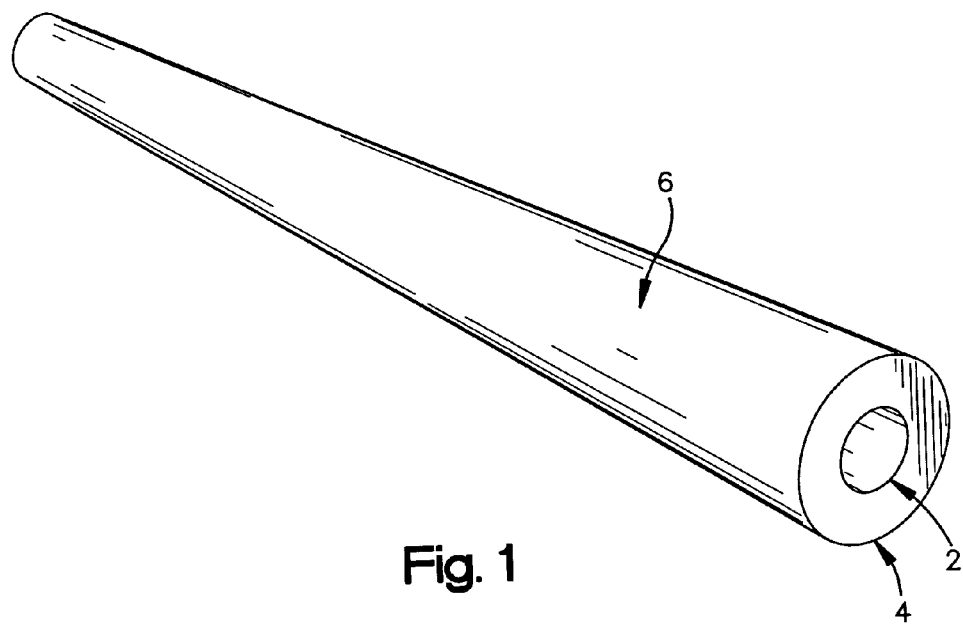
FIG. 1 is a perspective view of the SMP tube in its pre-form state.

Referring to the drawings in greater detail, the method of the invention herein is directed to fabricating and using a removable mandrel made of Shape Memory Polymer (SMP) in the manufacture of castable composite parts.

Examples 1 and 2 below describe the exemplary methods of creating pre-form tubes of SMP. In general, the preferred SMP is a styrene copolymer based SMP, however, other types of SMPs such as cyanate ester, polyurethane, polyethylene homopolymer, styrene-butadiene, polyisoprene, copolymers of stearyl acrylate and acrylic acid or methyl acrylate, norbonene or dimethaneoctahydronapthalene homopolymers or copolymers, malemide and other materials are within the scope of the present invention.

Example 1

A polymeric reaction mixture was formulated by mixing vinyl neodecanoate (10%), divinyl benzene (0.8%), and styrene (85.2%) in random order to yield a clear solution. Benzoyl peroxide paste (4%) which is 50% benzoyl peroxide was then added to the resulting solution (all composition % are by weight). The resulting mixture is continually mixed at room temperature in a water or ice bath until a clear solution is achieved which can take 2 hours or longer depending on the amount of shape memory polymer resin needed. The resulting solution was kept cold in a refrigerator before use. To prepare the shape memory polymer (SMP) cylinder, the reaction mixture formulated above was placed in the hollow space between a plastic inner cylinder and an outer glass cylinder. The cylinders are separated at the bottom and top by a Viton® spacer. The Viton® spacer also acts as sealant in the mold. The sample is then heated in an oven maintained at atmospheric pressure and a temperature of 75° C. for 36 hours. After the cylinder is cured for the specified period of time, it is removed from the oven and allowed to cool down to room temperature. The outer glass and inner plastic cylinders are removed to obtain a clear cylinder of shape memory polymer.

Example 2

A polymeric reaction mixture was formulated by mixing vinyl neodecanoate (10%), divinyl benzene (0.8%), and styrene (55.2%) in random order to form a colorless solution. Polystyrene granules (30%) were then added to the resulting solution. The resulting mixture was then allowed to sit at room temperature with occasional stirring until all the polystyrene granules were dissolved to give a clear, viscous solution. Benzoyl peroxide paste (4%) which is 50% benzoyl peroxide, was then added to the resulting solution (all composition % are by weight). The resulting mixture is continually mixed at room temperature in a water or ice bath until a clear solution is achieved which can take 2 hours or longer depending on the amount of shape memory polymer resin needed. The resulting solution is kept cold in a refrigerator before use. To prepare the shape memory polymer (SMP) cylinder, the reaction mixture formulated above is placed in the hollow space between a plastic inner cylinder and an outer glass cylinder. The cylinders are separated at the bottom and top by a Viton® spacer. The Viton® spacer also acts as sealant in the mold. The sample is then heated in an oven maintained at atmospheric pressure and a temperature of 75° C. for 36 hours. After the cylinder is cured for the specified period of time, it is removed from the oven and allowed to cool down to room temperature. The outer glass and inner plastic cylinders are removed to obtain a clear cylinder of shape memory polymer.

FIGS. 1-6 show an SMP mandrel system for manufacturing a hollow composite part. As shown in FIG. 1 a SMP material is processed into a substantially tubular memorized shape, generally designated 6. The tubular shape may comprise one open end and one closed end or two open ends. FIG. 1 shows a processed SMP tube with two open ends with the outer diameter of the tube generally designated 4 and the inner diameter of the tube generally designated 2.

Figure 2:
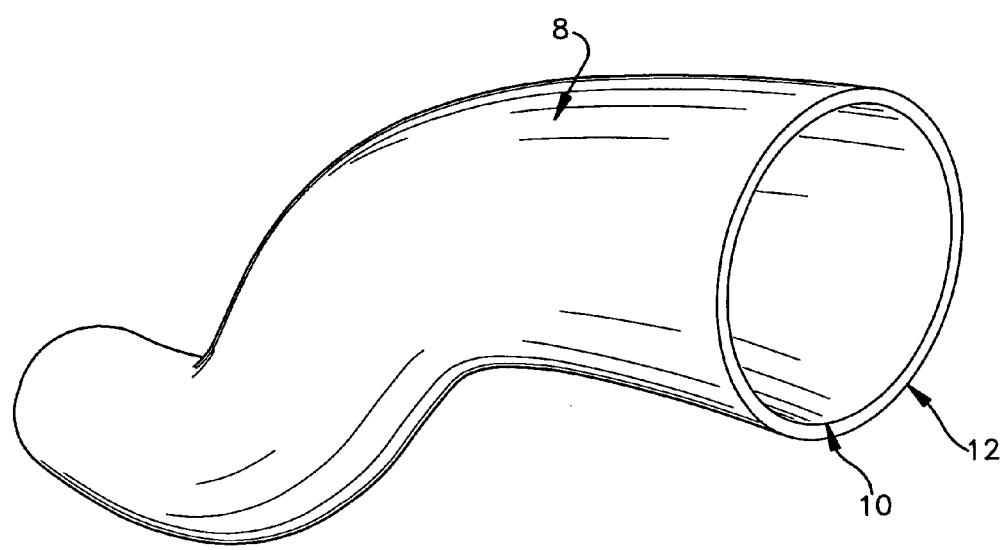
FIG. 2 is a perspective view of the SMP deformed to replicate the shape and size of a mold and is now a mandrel.

The substantially tubular SMP is then placed into a mold and "inflated" into a deformed SMP mandrel as shown in FIG. 2, generally designated 8, with outer dimensions of the tube generally designated 12 and the inner dimensions of the tube generally designated 10. As previously noted, numerous types of SMP exist and each type can be tailored to meet the specific tolerances and temperature requirements needed. With the preferred SMP as described in Example 1 or 2, the deformed SMP mandrel shape can be significantly larger than the corresponding memorized processed pre-form tubular shape, expanding by as much as 400% during the inflation process, or be compressed to 10% of its original size as needed. The inflation process can be accomplished by pressurized gasses, use of fluids, vacuum forming or other methods which are all within the scope of the present invention. The pressurized gasses and fluids may be heated to facilitate heating the processed SMP tube above its transition temperature.

In the preferred process, the substantially tubular SMP, 6, is placed inside a mold, or tooling, of the desired shape. Preferably, the substantially tubular SMP, 6, is deformed by inserting the SMP mandrel into a mold cavity which has an inner surface in a shape to be replicated by the outer dimensions of the deformed SMP mandrel, 12. The SMP is then heated above its predetermined transition temperature, ("$T_g$"), at which point the SMP transforms from a rigid substance to an elastic, flexible, and soft substance. Pressurized air, gas or vacuum is then applied causing the SMP tube, 6, to deform and the outer dimension, 12, of the deformed SMP mandrel, 8, to replicate the interior of the mold. After the deformed SMP, 8, has cooled to below its $T_g$, it is removed from the mold and is ready for filament winding. Although, as described herein for illustrative purposes, the pre-form shape, or memory shape, is substantially tubular, all other preform memory shapes such as squares, rectangles, triangles, pyramids, cubes, boxes of all shapes and sizes, spheres, and all other geometric shapes are within the scope of the present invention.

Figure 3:
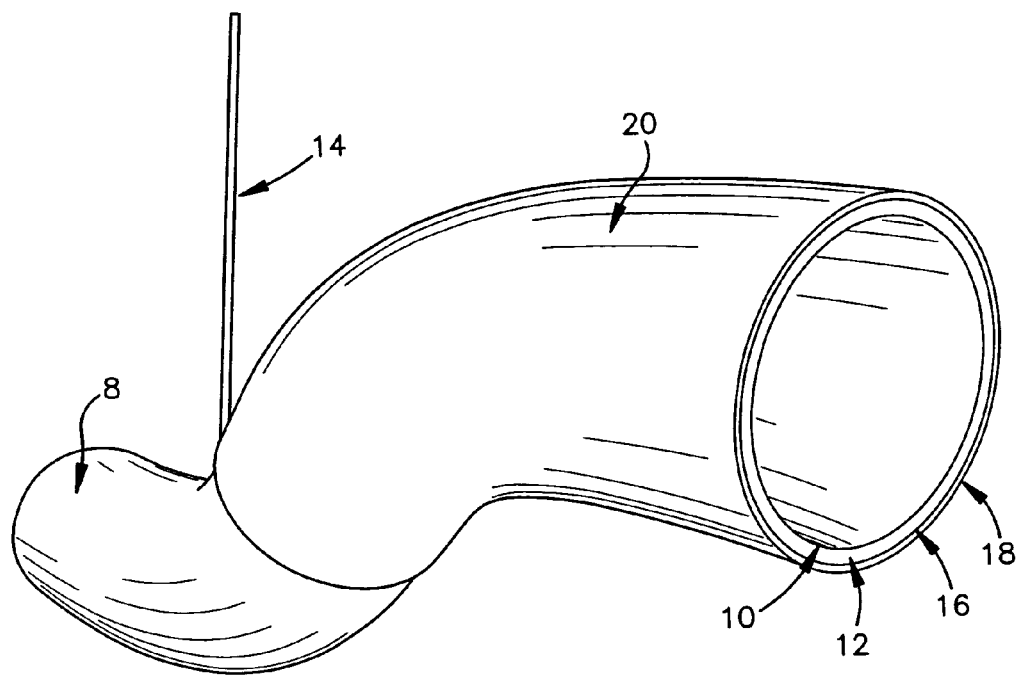
FIG. 3 is a perspective view of the SMP mandrel undergoing filament winding.
Figure 4:
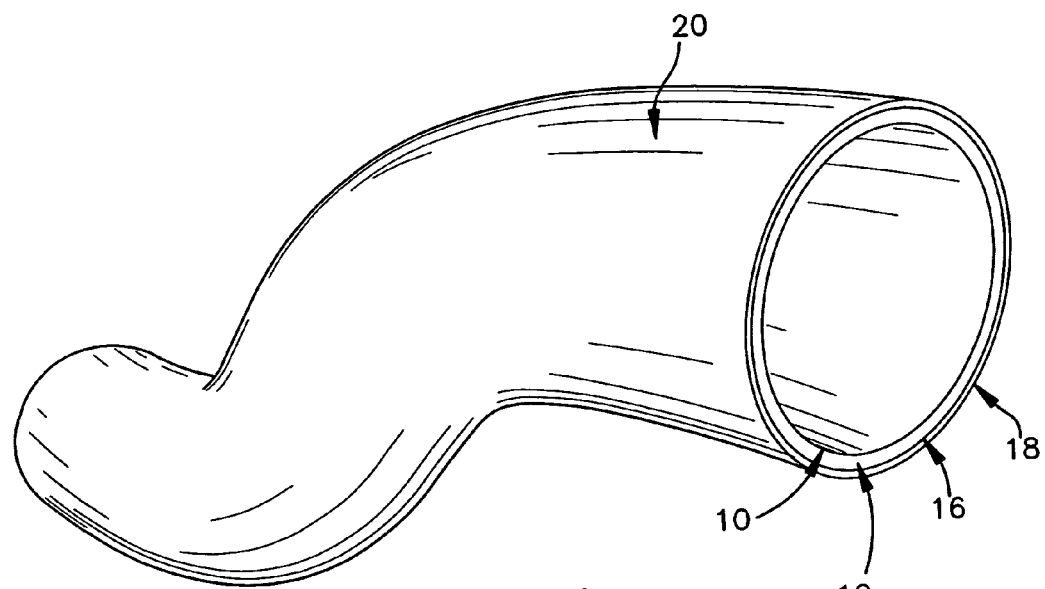
FIG. 4 is a perspective view of the finished composite part and the SMP mandrel.

In the exemplary method, once the deformed SMP mandrel, 8, has cooled, resin soaked fiber reinforcement, generally indicated as 14, is then filament wound around the deformed SMP mandrel, 8, to produce a hollow composite part as shown in FIG. 3. In the exemplary embodiment the resin soaked fibers, 14, are continuously wound around the deformed SMP mandrel, 8, to replicate the outer dimensions of the SMP Mandrel, 12, with the composite part inner dimensions, generally indicated as 16, replicating the outer dimensions of the SMP mandrel, 12. Additionally the outer dimensions of the composite part, generally indicated as 18, also replicate the general shape of the deformed SMP mandrel, 8. The composite part, generally indicated as 20, begins to take shape as the fibers are continuously wound around the deformed SMP mandrel, 8. FIG. 4 shows the completion of the filament winding process where the replicated composite part, 20, is seen to replicate the outer dimensions of the deformed SMP Mandrel, 8. The composition SMP mandrel can be adjusted to accommodate nearly any tolerance or strength requirement needed to manufacture composite parts.

In the exemplary method, the resin soaked composite part, 20, is then cured simultaneously in an over or autoclave with the deformed SMP mandrel to ensure that the composite part, 20, retains the shape of the SMP mandrel. This can be accomplished as the SMP utilized to form the mandrel will be selected such that it has a $T_g$ higher than the curing temperature of the composite part. Therefore, the SMP mandrel will not return to its original size and shape during the curing process. The curing of the composite part may occur within an autoclave, oven or be cured utilizing any one of a number of additional curing techniques.

Figure 5:
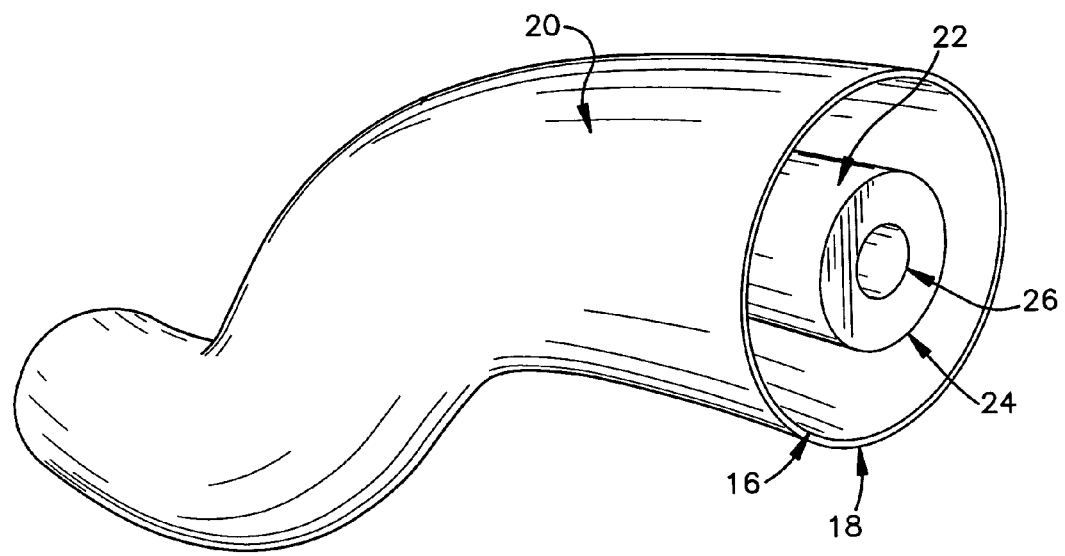
FIG. 5 is a perspective view of the finished composite part and the SMP mandrel relaxing to its memorized shape and size.
Figure 6:
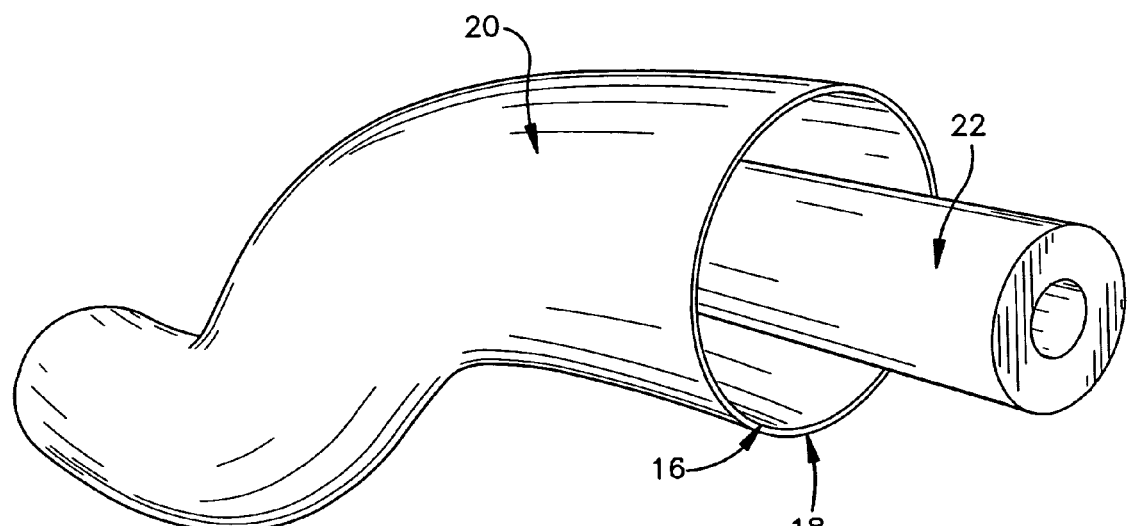
FIG. 6 is a perspective view of the relaxed SMP mandrel being withdrawn from the finished composite part.

FIG. 5 shows that subsequent to the curing the composite part, the temperature of the deformed SMP mandrel system is elevated above the $T_g$ of the SMP material from which the SMP mandrel blank is comprised, inducing the deformed SMP mandrel to relax to its memorized shape. This relaxed mandrel, generally designated as 22, comprises an outer dimension, generally designated 24, which is smaller than the corresponding inner dimensions of the cured composite part 16. Since the relaxed mandrel, 22, is now smaller than the composite part's inner dimension, 16, it can be quickly and easily removed from within the composite part without damage to the finished composite part as shown in FIG. 6. Additionally, because the relaxed mandrel, 24, when raised above its $T_g$, is soft and flexible, it can easily be removed from complex parts without damage to the cured composite part or the relaxed SMP mandrel. Once removed from the part and cooled to below its $T_g$, the relaxed SMP mandrel will return to its original memorized shape, as shown in FIG. 1, and can be reused multiple times.

The use of a SMP mandrel process as described above is useful in manufacturing solid rocket motor casings, filament wound hollow composite components, bottles, and other composite parts comprising at least partially hollow interior portions.

As can be seen from the examples, the use of SMP as a mandrel provides significant advantages that should be apparent to those skilled in the art. It will be understood that the invention may be embodied in other specific forms without departing from the spirit or central characteristics thereof. The present examples and embodiments, therefore, are to be considered in all respects as illustrative, and not restrictive, and the invention is not to be limited to the details given herein.

What is claimed is:

1. A method for manufacturing composite parts with a mandrel comprising:
    a) providing a processed shape memory polymer with a memorized shape and a transition temperature;
    b) a means for deforming said processed shape memory polymer into various geometric shapes resulting in a deformed shape memory polymer wherein said deformed shape memory polymer has an exterior side and interior side;
    c) a means for creating a composite part on the exterior side of said deformed shape memory polymer;
    d) a means for inducing said deformed shape memory polymer to relax to said memorized shape such that said processed shape memory polymer is removable from within said composite part; and
    e) said processed shape memory polymer is in the form of particle, foam or gel.

2. A method for manufacturing composite parts with a mandrel comprising:
    a) providing a processed shape memory polymer with a memorized shape and a transition temperature;
    b) a means for deforming said processed shape memory polymer into various geometric shapes resulting in a deformed shape memory polymer wherein said deformed shape memory polymer has an exterior side and interior side;
    c) a means for creating a composite part on the exterior side of said deformed shape memory polymer;
    d) a means for inducing said deformed shape memory polymer to relax to said memorized shape such that said processed shape memory polymer is removable from within said composite part; and
    e) said processed shape memory polymer is reinforced with a fibrous material including chopped fiber, continuous fiber, or any type of stretchable or non-stretchable textile fabric.

* * * * *